(12) United States Patent
Farouki

(10) Patent No.: US 10,782,844 B2
(45) Date of Patent: Sep. 22, 2020

(54) SMART WHITEBOARD INTERACTIONS

(71) Applicant: MICROSOFT TECHNOLOGY LICENSING, LLC, Redmond, WA (US)

(72) Inventor: Karim Farouki, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 501 days.

(21) Appl. No.: 15/344,728

(22) Filed: Nov. 7, 2016

(65) Prior Publication Data

US 2017/0052668 A1   Feb. 23, 2017

Related U.S. Application Data

(63) Continuation of application No. 13/711,348, filed on Dec. 11, 2012, now Pat. No. 9,519,414.

(51) Int. Cl.
  *G06F 3/0481*   (2013.01)
  *G06F 3/0485*   (2013.01)
  (Continued)

(52) U.S. Cl.
  CPC ........ *G06F 3/0481* (2013.01); *G06F 3/03545* (2013.01); *G06F 3/0485* (2013.01);
  (Continued)

(58) Field of Classification Search
  CPC .................................................. G06F 17/242
  See application file for complete search history.

(56) References Cited

U.S. PATENT DOCUMENTS 6,016,494 A   1/2000  Isensee et al.
6,144,991 A   11/2000 England
(Continued)

FOREIGN PATENT DOCUMENTS

JP   H09200361 A   7/1997
JP   2000056747 A   2/2000
(Continued)

OTHER PUBLICATIONS

Flatland: New Dimensions in Office Whiteboards by Elizabeth D. Mynatt (Year: 1999).*

(Continued)

*Primary Examiner* — William L Bashore
*Assistant Examiner* — Nathan K Shrewsbury
(74) *Attorney, Agent, or Firm* — Talem IP Law, LLP

(57) ABSTRACT

Technologies are generally described for providing whiteboard records accessibility to users interacting with a whiteboard. A whiteboard may enable two or more users to interact with the whiteboard concurrently. The whiteboard may identify the users interacting with the whiteboard and may identify permission settings associated with the users. Based on the identification of the users and detected permission settings, the whiteboard ma activate a whiteboard records accessibility mode to provide access to whiteboard records. In a public mode, any user may interact with the whiteboard, and the whiteboard may provide access to a public records data store. In a private mode, the whiteboard may provide access to a separate private records data store associated with an authenticated user interacting with the whiteboard. When two users interact with the whiteboard concurrently, the whiteboard may separate the whiteboard records such that each user can access records corresponding to the detected permission settings.

21 Claims, 11 Drawing Sheets

(51) Int. Cl.
  *G06F 3/0354*  (2013.01)
  *G06F 3/0484*  (2013.01)
  *G06F 3/0488*  (2013.01)
  *G06F 3/14*  (2006.01)
  *G06F 40/171*  (2020.01)
  *G06F 3/01*  (2006.01)
  *G06F 3/03*  (2006.01)
  *G06F 3/0346*  (2013.01)
  *G06F 3/0489*  (2013.01)

(52) U.S. Cl.
  CPC ...... *G06F 3/04842* (2013.01); *G06F 3/04845* (2013.01); *G06F 3/04883* (2013.01); *G06F 3/14* (2013.01); *G06F 3/013* (2013.01); *G06F 3/0304* (2013.01); *G06F 3/0346* (2013.01); *G06F 3/03543* (2013.01); *G06F 3/0489* (2013.01); *G06F 40/171* (2020.01); *G06F 2203/04806* (2013.01)

(56) References Cited

U.S. PATENT DOCUMENTS

| | | | |
|---|---|---|---|
| 6,840,442 | B2 | 1/2005 | Swaminathan et al. |
| 7,010,752 | B2 | 3/2006 | Ly |
| 7,068,288 | B1 | 6/2006 | Good et al. |
| 7,106,312 | B2* | 9/2006 | Pennington, II .... G06F 3/04883 345/157 |
| 7,325,197 | B1 | 1/2008 | Massena et al. |
| 7,423,659 | B1* | 9/2008 | Pratley .................. G06F 40/103 345/660 |
| 7,483,017 | B2* | 1/2009 | Silverman .......... G06K 9/00402 345/179 |
| 7,508,354 | B1 | 3/2009 | Sanders et al. |
| 7,681,136 | B2 | 3/2010 | Gennaro et al. |
| 7,814,433 | B2* | 10/2010 | Johanson .................. H04N 7/15 345/156 |
| 7,907,141 | B2 | 3/2011 | Saund |
| 8,279,186 | B2 | 10/2012 | Pearce et al. |
| 9,430,140 | B2 | 8/2016 | Reuschel et al. |
| 9,575,712 | B2 | 2/2017 | Farouki |
| 10,038,740 | B2* | 7/2018 | Soon-Shiong ...... G06F 16/7837 |
| 2002/0066782 | A1* | 6/2002 | Swaminathan .......... G06F 16/40 235/375 |
| 2003/0095113 | A1 | 5/2003 | Ma et al. |
| 2004/0017400 | A1 | 1/2004 | Ly et al. |
| 2004/0146199 | A1* | 7/2004 | Berkner .............. G06F 16/9577 382/176 |
| 2005/0099407 | A1* | 5/2005 | Pennington, II .... G06F 3/04883 345/179 |
| 2005/0104864 | A1* | 5/2005 | Zhang .................... G06F 3/017 345/173 |
| 2005/0190768 | A1* | 9/2005 | Cutler .................... H04M 3/567 370/395.2 |
| 2006/0010197 | A1* | 1/2006 | Ovenden ................ G06Q 10/00 709/204 |
| 2007/0002377 | A1 | 1/2007 | Tokunaga |
| 2007/0106950 | A1 | 5/2007 | Hutchinson et al. |
| 2007/0124503 | A1* | 5/2007 | Ramos .................... G06F 3/017 709/248 |
| 2008/0062438 | A1* | 3/2008 | Lin .......................... G06K 9/42 358/1.2 |
| 2008/0209327 | A1 | 8/2008 | Drucker et al. |
| 2008/0232690 | A1* | 9/2008 | Saund .................... G06K 9/222 382/187 |
| 2009/0234721 | A1 | 9/2009 | Bigelow et al. |
| 2009/0265634 | A1 | 10/2009 | Beringer et al. |
| 2009/0315861 | A1 | 12/2009 | Zhang et al. |
| 2010/0017727 | A1 | 1/2010 | Offer et al. |
| 2010/0070878 | A1 | 3/2010 | Amento et al. |
| 2010/0100866 | A1 | 4/2010 | Kamper et al. |
| 2010/0191799 | A1 | 7/2010 | Fiedorowicz et al. |
| 2010/0257457 | A1 | 10/2010 | De Goes |
| 2011/0113323 | A1 | 5/2011 | Fillion et al. |
| 2011/0179351 | A1 | 7/2011 | Capela et al. |
| 2011/0197132 | A1 | 8/2011 | Escoda et al. |
| 2011/0246875 | A1 | 10/2011 | Parker et al. |
| 2012/0020562 | A1 | 1/2012 | Vojak |
| 2012/0075182 | A1 | 3/2012 | Kim et al. |
| 2012/0098757 | A1 | 4/2012 | Samadani et al. |
| 2012/0113238 | A1 | 5/2012 | Yamamoto et al. |
| 2012/0176308 | A1 | 7/2012 | Westermann et al. |
| 2012/0229468 | A1 | 9/2012 | Lee et al. |
| 2012/0278738 | A1 | 11/2012 | Kruse et al. |
| 2013/0018960 | A1 | 1/2013 | Knysz et al. |
| 2013/0047093 | A1 | 2/2013 | Reuschel et al. |
| 2013/0103946 | A1 | 4/2013 | Binenstock |
| 2013/0283192 | A1 | 10/2013 | Kranzberg et al. |
| 2013/0307796 | A1 | 11/2013 | Liu et al. |
| 2013/0346924 | A1 | 12/2013 | Morrill et al. |
| 2014/0033073 | A1 | 1/2014 | Pegg |
| 2014/0040767 | A1 | 2/2014 | Bolia |
| 2014/0118314 | A1 | 5/2014 | Black et al. |
| 2014/0149880 | A1 | 5/2014 | Farouki |
| 2014/0165152 | A1 | 6/2014 | Farouki |
| 2014/0282229 | A1 | 9/2014 | Laukkanen et al. |
| 2017/0115855 | A1 | 4/2017 | Farouki |

FOREIGN PATENT DOCUMENTS

| | | |
|---|---|---|
| JP | 2002118738 A | 4/2002 |
| JP | 2005318589 A | 11/2005 |
| KR | 10-2006-0045523 A | 5/2006 |
| WO | 2012091723 A1 | 7/2012 |

OTHER PUBLICATIONS

"Office Action and Search Report Issued in Taiwan Application No. 102144091", dated Jan. 24, 2017, 13 Pages.

"Final Office Action Issued in U.S. Appl. No. 13/687,681", dated Feb. 3, 2016, 13 Pages.

"Non-Final Office Action Issued in U.S. Appl. No. 13/687,681", dated Jul. 1, 2016, 18 Pages.

"Non-Final Office Action Issued in U.S. Appl. No. 13/687,681", dated Jun. 29, 2015, 12 Pages.

"Office Action Issued in European Patent Application No. 13815201. 2", dated May 15, 2018, 5 Pages.

"Supplementary Search Report Issued in European Patent Application No. 13815201.2", dated Jun. 6, 2016, 8 Pages.

"First Office Action and Search Report Issued in Chinese Patent Application No. 201380062280.2", dated Mar. 27, 2017, 13 Pages.

"Office Action Issued in Chinese Patent Application No. 201380062280. 2", dated Jul. 3, 2018, 18 Pages.

"Second Office Action and Search Report Issued in Chinese Patent Application No. 201380062280.2", dated Dec. 22, 2017, 14 Pages.

"Office Action Issued in Japanese Patent Application No. 2015-544217", dated Jul. 21, 2017, 16 Pages.

"Office Action Issued in Japanese Patent Application No. 2015-544217", dated Jan. 25, 2018, 10 Pages.

"Office Action Issued in Japanese Patent Application No. 2015-544217", dated Jul. 3, 2018, 7 Pages.

Gumienny, et al., "Tele-Board: Enabling Efficient Collaboration In Digital Design Spaces", In Proceedings of 15th International Conference on Computer Supported Cooperative Work in Design, vol. 11, Jun. 8, 2011, 8 Pages.

"International Search Report and Written Opinion Issued in PCT Patent Application No. PCT/US2013/072437", dated Sep. 25, 2014, 7 Pages.

Sibbet, David, "Visual Teams: Graphic Tools for Commitment, Innovation, and High Performance", by Willey Publishers, Oct. 11, 2011, 7 Pages.

"Edutainment", Retrieved from <<http://web.archive.org/web/20100723153440/http://www.visionobjects.com/en/solution-for/edutainement/description>>, Jul. 23, 2010, 2 Pages.

"Getting Started with Microsoft Lync Server 2010", Retrieved from <<http://web.archive.org/web/20130212060744/ http://download. microsoft.com/download/E/0/5/E05BCCC7-E2D6-4065-B0E9-EEDF1116EFF8/LS_Getting_Started.doc>>, Mar. 2012, 86 Pages.

(56) References Cited

OTHER PUBLICATIONS

"StarBoard FX-77GII", Retrieved from <<http://web.archive.org/web/20160804215148/http://insiteinfo.com/images/StarBoardFX77GII_Brochure0212.pdf>>, Retrieved On: Aug. 28, 2012, 2 Pages.

"Final Office Action Issued in U.S. Appl. No. 13/711,348", dated Jun. 7, 2016, 14 Pages.

"Non Final Office Action Issued in U.S. Appl. No. 13/711,348", dated Oct. 15, 2015, 15 Pages.

"Notice of Allowance Issued in U.S. Appl. No. 13/711,348", dated Aug. 11, 2016, 9 Pages.

Haller, et al., "The NiCE Discussion Room: Integrating Paper and Digital Media to Support Co-Located Group Meetings", In Proceedings of the SIGCHI Conference on Human Factors in Computing Systems, Apr. 10, 2010, 10 Pages.

Kunz, et al., "CollaBoard: A Novel Interactive Electronic Whiteboard for Remote Collaboration with People on Content", In Proceeding of the IEEE International Conference on Cyberworlds, Oct. 20, 2010, pp. 430-437.

"International Search Report and Written Opinion Issued in PCT Application No. PCT/US2013/074442", dated Mar. 5, 2014, 9 Pages.

"Non Final Office Action Issued in U.S. Appl. No. 15/398,901", dated Apr. 19, 2019, 23 Pages.

"Office Action Issued in Korean Patent Application No. 10-2015-7015281", dated Jan. 14, 2020, 19 Pages.

"Final Office Action Issued in U.S. Appl. No. 15/398,901", dated Nov. 29, 2019, 25 Pages.

Tseng, et al., "Immersive Whiteboards in a Networked Collaborative Environment", in Proceedings of IEEE International Conference on Multimedia and Expo, Aug. 22, 2001, 04 Pages.

"Non-Final Office Action Issued in U.S. Appl. No. 15/398,901", dated Jun. 24, 2020, 23 Pages.

* cited by examiner

US 10,782,844 B2

SMART WHITEBOARD INTERACTIONS

CROSS REFERENCE TO RELATED APPLICATION

This application is a continuation application under 35 U.S.C. § 120 of U.S. patent application Ser. No. 13/711,348 tiled on Dec. 11, 2012. The U.S. Patent Application is herein incorporated by reference in its entirety.

BACKGROUND

With the proliferation of collaborative computing and networking technologies, the need to share content and to control and interact with shared is prevalent. Teleconferencing and desktop sharing are example techniques for enabling users in remote locations to share content and to interact with each other without being in the physical presence of each other. Additionally, the ability to continuously share content, interact with and update content has become useful as users collaborate on projects and desire to generate and update content in real-time. Interactive whiteboards are often used to capture written content on a display screen and enable real-time content manipulation, however conventional interactive whiteboards may not have the capabilities enabling multiple users to manipulate and provide content or enabling interaction from remote locations.

Conventional electronic whiteboards either capture written content on an actual hoard or are interactive screens with limited content creation capabilities. Capabilities of modern interactive computing devices such as ink recognition, desktop slurring, searches, etc. are not thought of as being features of whiteboards.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a canvas for a smart whiteboard that may enable panning of canvases and/or selection of objects and regions through single finger touch or detection of gesture, automatic expansion of containers in response to added ink, and use of pen or touch for distinct actions such as create delete vs. manipulation. According to some examples, capture and playback of content creation (e.g. on distinct canvases) on the whiteboard and/or associated devices may also be enabled. Furthermore, content (objects, etc) may be auto-transformed based on user pattern or predicted examples.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF DRAWINGS

FIG. 15 illustrates automatic transformation of content based on predicted input;

DETAILED DESCRIPTION

As briefly described above, panning of canvases and/or selection of objects and regions through single finger touch or detection of gesture, automatic expansion of containers in response to added ink, use of pen or touch for distinct actions such as create/delete vs. manipulation, capture and playback of content creation (e.g. on distinct canvases) on the whiteboard and/or associated devices, and/or auto-transform of content (objects, etc.) based on user pattern or predicted examples may be enabled in a smart whiteboard application.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable hardware. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

Figure 1:
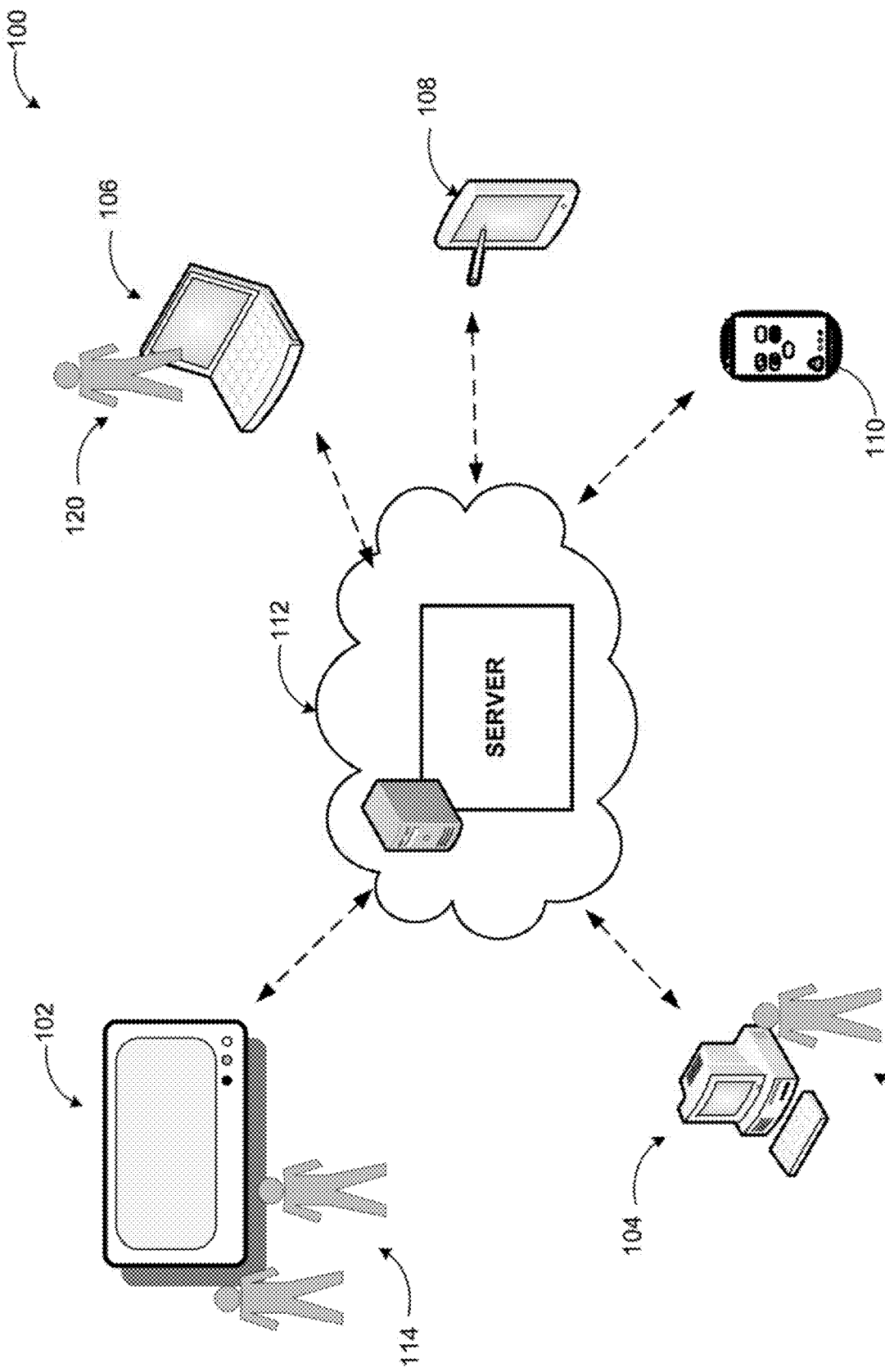
FIG. 1 illustrates an example collaborative environment where whiteboard sharing may be employed.

FIG. 1 illustrates an example collaborative environment where whiteboard sharing may be employed. In a collaborative environment two or more users may interact with a whiteboard concurrently. As illustrated in diagram 100, a whiteboard may be an interactive whiteboard 102, and may enable interaction between multiple users 114, 116, 120 and multiple client devices. Some example client devices may include as a desktop computing device 104, a personal computer 106, a tablet or slate 108, a smartphone 110, and other similar client devices. An interactive whiteboard 102 may also be connected to a projector which may display the desktop of the client device on the user interlace surface of the interactive whiteboard 102. The interactive whiteboard 102 may be connected with the one or more client devices over a network, which may be a wired or wireless network. Additionally, the interactive whiteboard may also be connected with the one or more client devices over a cloud network 112. Interactive whiteboards may be configured to recognize handwriting and translate handwriting into text, enable quick annotations on content displayed on the whiteboard, receive input from multiple computing devices, and receive input from multiple users.

Figure 2:
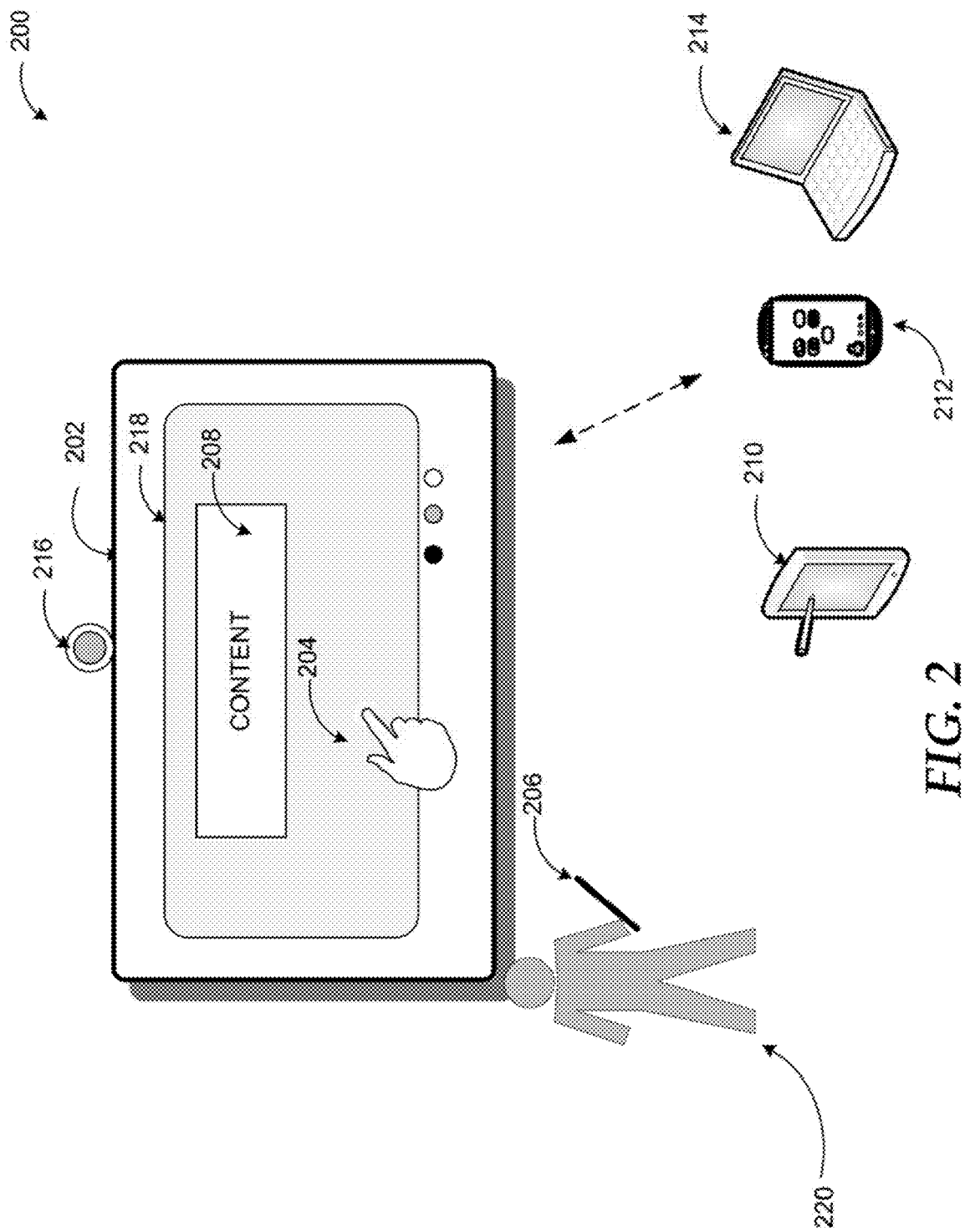
FIG. 2 illustrates an example environment enabling interaction with a whiteboard through multiple input methods.

FIG. 2 illustrates an example environment enabling interaction with a whiteboard through a plurality of input methods. As demonstrated in diagram 200, an interactive whiteboard 202 may enable a user 220 to interact with the whiteboard 202 employing a variety of input methods to provide input to the whiteboard. Input may be provided on an interface of the whiteboard 202, which may be a virtual canvas 218. Example input actions on the whiteboard 202 may include creating new content on the virtual canvas 218, modifying existing content, and deleting content. Additionally, the user 220 may adjust placement, formatting, and style of the content 208 on the virtual canvas 218.

In some example embodiments, the whiteboard 202 may enable the user 220 to provide input actions to the virtual canvas 218 directly using an input device. Some example conventional input devices may be an interactive stylus 206, electronic pen, keyboard, and/or mouse. Additionally, the whiteboard 202 may be a gesture-enabled device, such that the whiteboard 202 may recognize gestures and/or eye tracking employing an optical or camera device 216. The whiteboard 202 may also be a touch-enabled device such that the whiteboard 202 may recognize finger touch 204 actions on the virtual canvas 218 as input methods for interacting with, controlling, and providing content 208 to the virtual canvas 218, The whiteboard may provide an indicator on the virtual canvas 218 to indicate the location of a touch or gesture input action.

Further, the whiteboard 202 may be configured to enable the user 220 to interact with the virtual canvas 218 employing an individual client device, such as a tablet or slate 210, a smartphone 212, and a personal computer 214, as some examples. The individual client devices (210, 212, 214) may be configured to enable interaction with the whiteboard 202 via a wired or wireless connection. The previously described client devices are exemplary and are not intended to be limiting. Any client device enabling interaction with the whiteboard 202 may be employed by the user to provide content 208 and interact with the virtual canvas 218.

In an example embodiment, the whiteboard 202 may be configured to recognize and track each input method, including touch, gesture, input device, and client device input. The whiteboard 202 may be configured to assign types of input actions to types of input methods, such that when a certain input method is employed by the user 220, the whiteboard 202 may be configured to recognize a distinct type of input action. For example, the whiteboard 202 may be assign that an input device such as the interactive stylus 206 or an electronic pen may be employed for creating, modifying, and deleting content and objects on the virtual canvas 218, while hand gestures and touch actions may be employed to perform manipulation and navigation actions on the virtual canvas 218 such as moving objects, scrolling, panning, zooming, and creating relationships between content and objects displayed on the virtual canvas 218.

Figure 3:
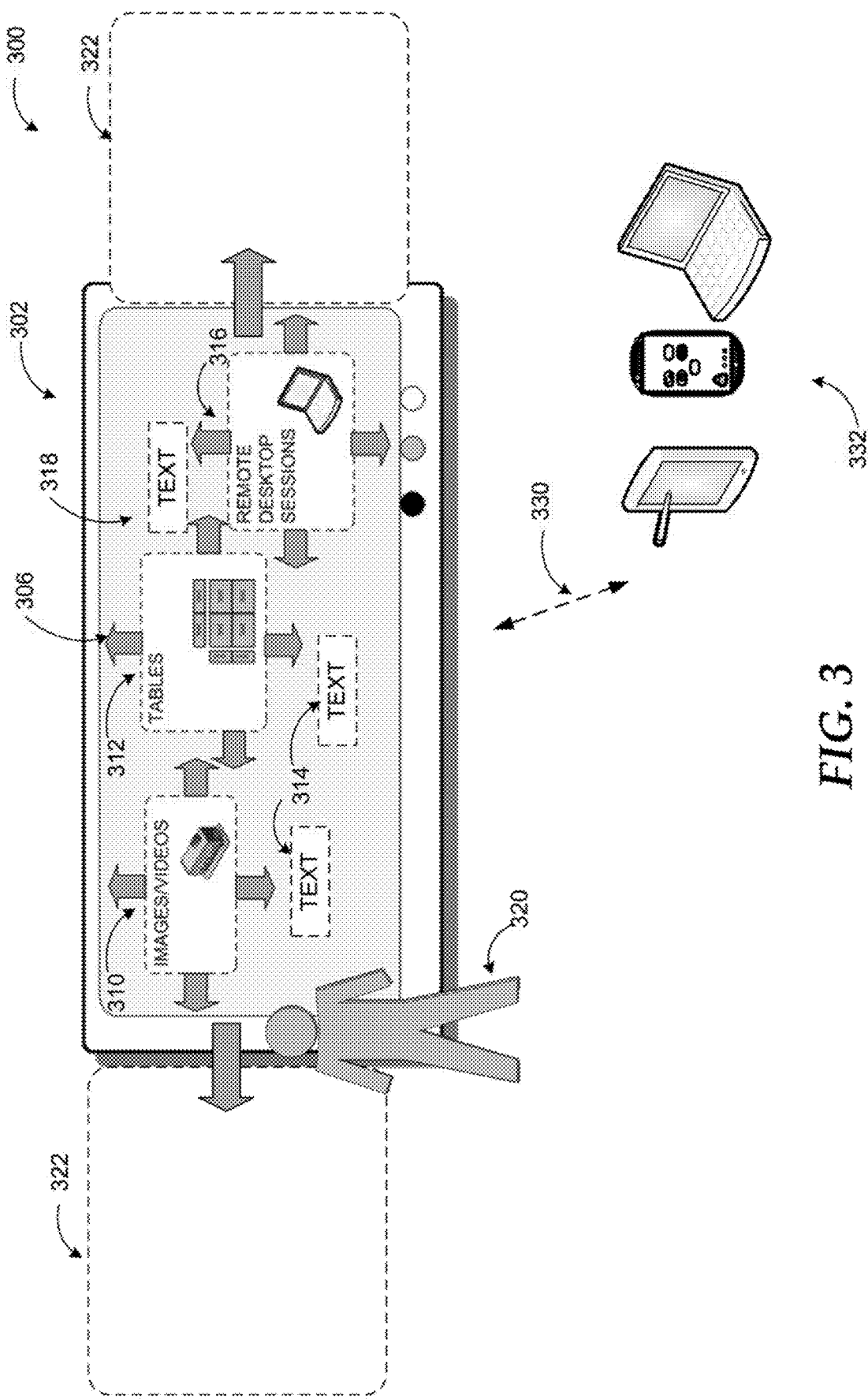
FIG. 3 illustrates example content creation and manipulation on a whiteboard.

FIG. 3 illustrates example content creation and manipulation on a whiteboard, according to some example embodiments. As demonstrated in diagram 300, a user may employ input actions to add content to a canvas 318 of a whiteboard 302. Content that may be added to a canvas may include text 314, audio/visual content 310 such as images and videos, and charts, graphs and tables 312. Additionally, the canvas 318 may display a shared interface 316 such as a shared desktop of one or more client devices 332 that may be connected with the whiteboard 302 over a wired or wireless network. The example objects described previously are not intended to be limiting, but are exemplary of types of content that may be input and displayed on the canvas 318.

In an example embodiment, the content may be input at any location on the canvas 318. The whiteboard 302 may be configured to group the input content based on the object type, such as images, video, tables, and remote desktop sharing session. Each group of objects may be displayed on the canvas 318 in distinct regions or panes. Each region may include one type of object, and the region may display multiple objects within the type of object. For example, one region may display a group of images input on the whiteboard canvas, while another region may display one or more tables and charts input on the canvas 318, and yet another region may display a shared interface 316 of a connected client device. Each region may enable a user to interact with each object within the region, and the whiteboard 302 may recognize different input actions based on the type of objects included within the region. Additionally, a user may create custom regions for grouping objects based on user selection rather than a type of object. The user may also select objects in one region and move, or drag, a selected object to a different region.

In an example embodiment, the regions may be automatically positioned on the canvas 318 according to pre-defined positioning settings and preferences. The whiteboard 302 may enable the regions to be resized and re-positioned on the whiteboard canvas 318. The user may employ touch and gesture input, as well as input with other input devices, to resize, and reposition the regions, and also to rearrange objects within the regions. The regions may be able to overlap as the user rearranges and re-positions the regions on the canvas 318.

In another example embodiment, the size and position of the regions and objects on the canvas 318 may be optimized, both horizontally and vertically, based on predefined settings. For example, the display of content an the canvas 318 may be optimized based on detection of an interacting user's size and position in relation to the whiteboard 302. For example, if the whiteboard 302 detects a short user, the content may be displayed on a lower portion of the canvas.

Additionally, if the whiteboard 302 detects that the user is far away from the whiteboard 302, the content may be displayed larger. The canvas 318 may be automatically optimized based on predefined settings, and may additionally be optimized according to user preferences. The whiteboard 302 may also be configured to automatically expand or grow (322) as content is added, enlarged, or moved outside of the currently displayed canvas 318 in order to enable the whiteboard canvas to display all of the content concurrently, and also to provide more blank space for adding additional content.

In another example embodiment, the whiteboard 302 may be configured to share the interface of the whiteboard 302 with one or more client devices connected with the whiteboard 302, such that each connected client device may continuously reflect the canvas 318 with the input content and grouped regions. When the canvas 318 is shared with one or more client devices having different sizes and dimensions than the whiteboard 302, the content of the canvas 318 may be reflowed, such that the objects and regions may be rearranged, for optimizing the display of the content on the interface of shared client devices.

Figure 4:
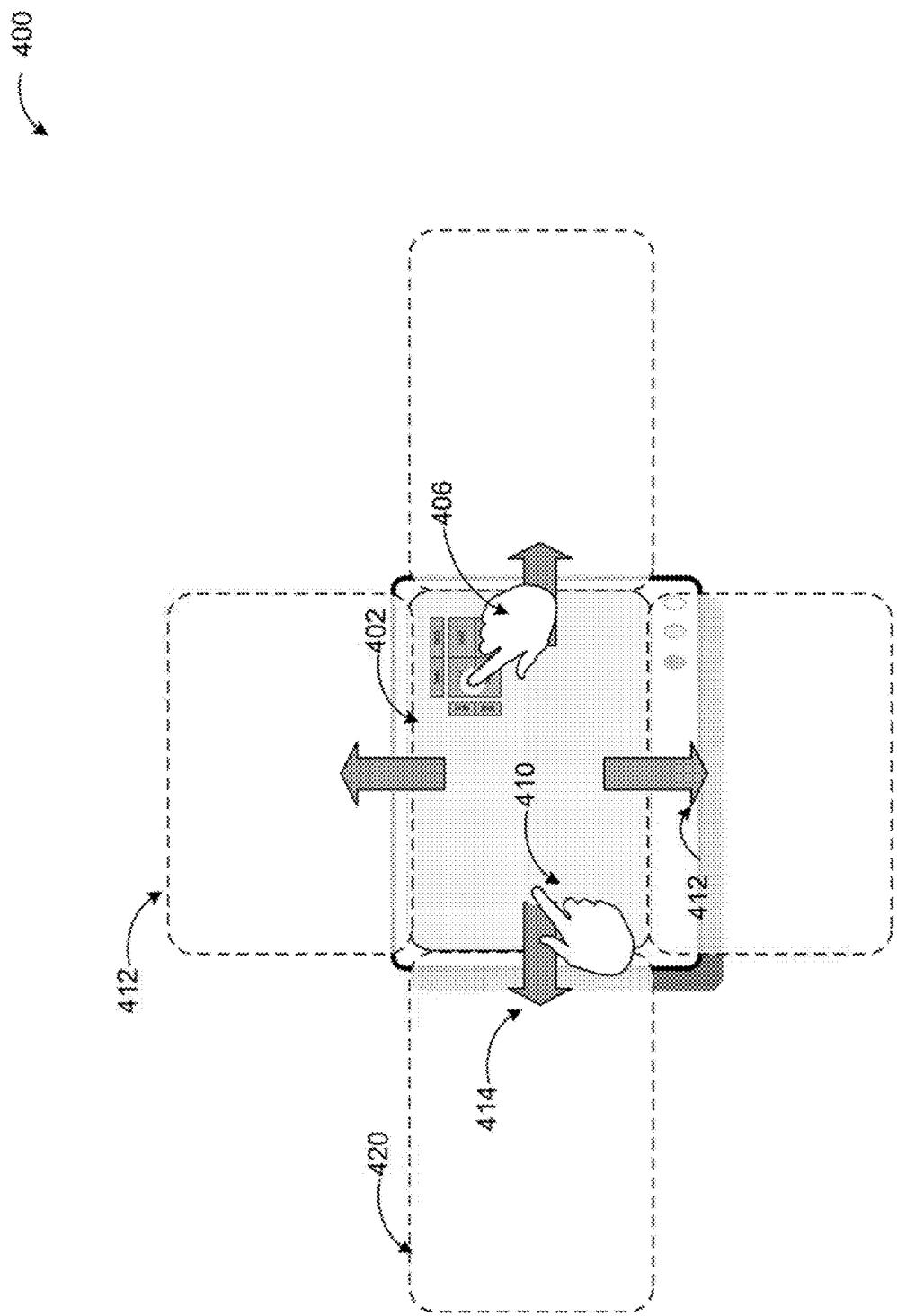
FIG. 4 illustrates example whiteboard canvas interaction and manipulation employing touch actions.

FIG. 4 illustrates example whiteboard canvas interaction and manipulation employing touch actions, according to some example embodiments. As demonstrated in diagram 400, a user may use input actions to manipulate a canvas. A user interacting with the displayed canvas 402 may employ touch and gesture input 406, as well as other input devices, to select, resize, reposition and rearrange content such as objects and regions on the displayed canvas 402. For example, a user may employ touch, swipe, drag, and pinch actions to enlarge, shrink, and otherwise modify the size and orientation of content such as text, images, graphics, tables, and regions displayed on the canvas.

Additionally, a user may employ input actions to navigate and manipulate the canvas itself. For example, a user may employ a touch action such as a touch and hold action or a drag action to pan and scroll the displayed canvas 402. The touch action may be performed with a finger or hand of the user, as well as with an input device such as an electronic pen or stylus. Another distinct touch action, such as a swipe 410 in a direction 414, may be employed to move the displayed canvas 402 in any direction in order to open a new canvas 420. For example, when a current canvas area is full or if the user wants to start with a blank canvas, the user may swipe in a particular direction, such as left/right/up/down, and a new blank canvas 420 may be presented. The new canvas 420 may be blank and maintain substantially the same dimensions and orientation as the previously displayed canvas 402. When the new canvas 420 is displayed, the content of the previously displayed canvas 402 may be automatically saved so that the content is preserved for later use. The user may also employ an additional touch action such as a swipe action to may bring back previous canvases. The content of the previously displayed canvas may be stored in a local memory, and may also be stored in other local or external storage associated with the whiteboard. The user may also employ an additional touch action such as a swipe action to may bring back previous canvases.

Figure 5:
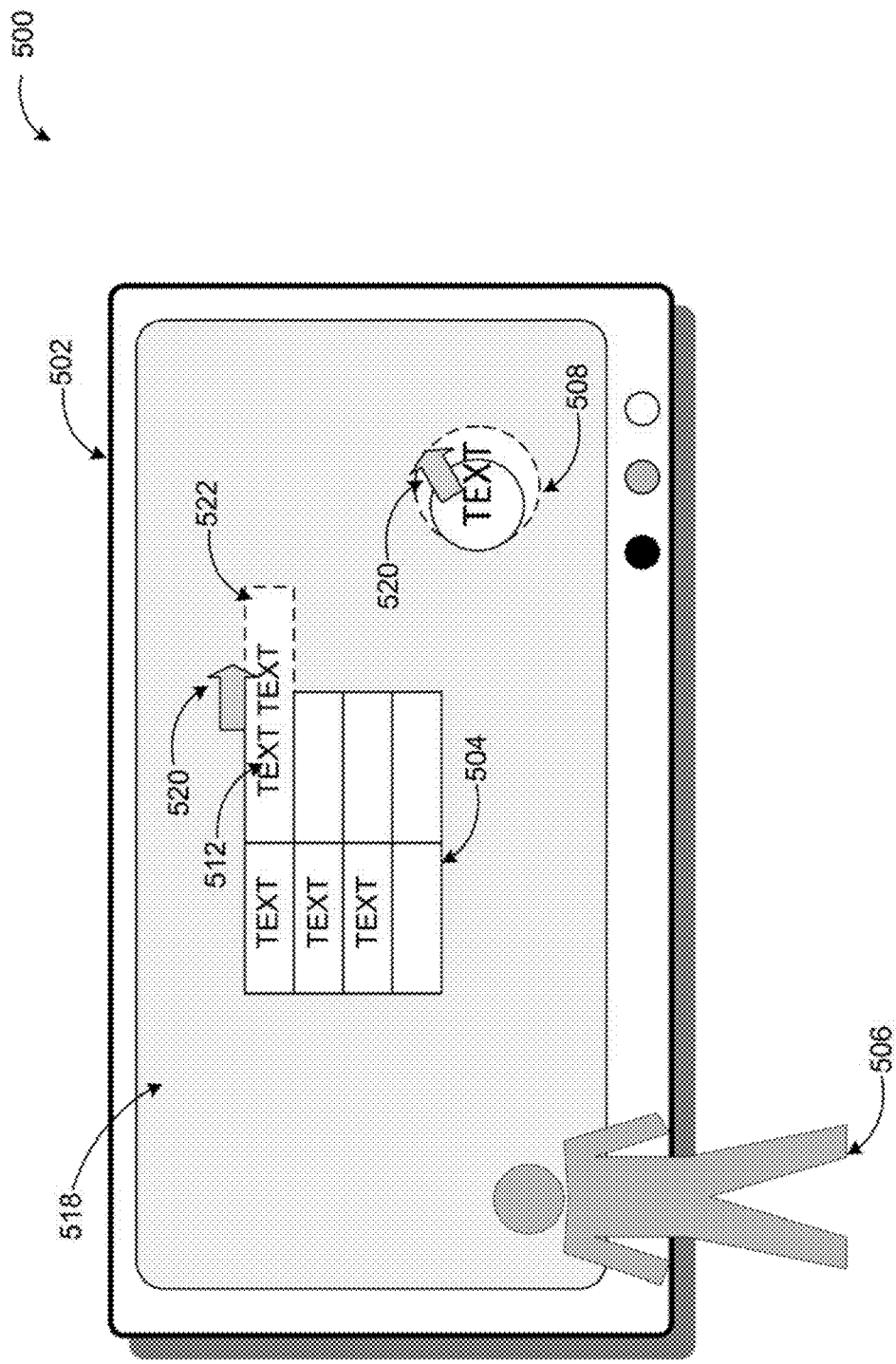
FIG. 5 illustrates automatic expansion of objects on a whiteboard canvas.

FIG. 5 illustrates automatic expansion of objects on a whiteboard canvas, according to some embodiments. As illustrated in diagram 500, a whiteboard 502 may be configured to enable automatic expansion of object containers on a canvas 518 in response to added content. An object on the canvas 518, such as a table 504, text box 508, pane, graphic, or other container may be created on the canvas 518, and the size and dimension boundaries of the object may be adjusted automatically based on a size of the content of the object.

The user 506 may also add additional content, such as text, to an existing object that extends beyond the object's boundaries, and in response, the object may automatically expand (520) to accommodate the additional content. For example, a cell 522 or a column of a table 504 may expand in response to the user 506 inserting text 512 in the cell 522 that goes beyond the right boundary of the cell. The cell 522 may be configured to expand in any direction for optimally accommodating the added content based on predefined settings and user preferences. The automatic adjustment of objects on the canvas may be based on predefined whiteboard settings, and may also be user customizable. For example, the user 506 may select to activate or deactivate automatic adjustment, and the user 506 may define a maximum and minimum size for an expanded object. The user may also select if text wrapping and/or text size adjustment may be applied to the inserted content instead of adjusting the object size.

Figure 6:
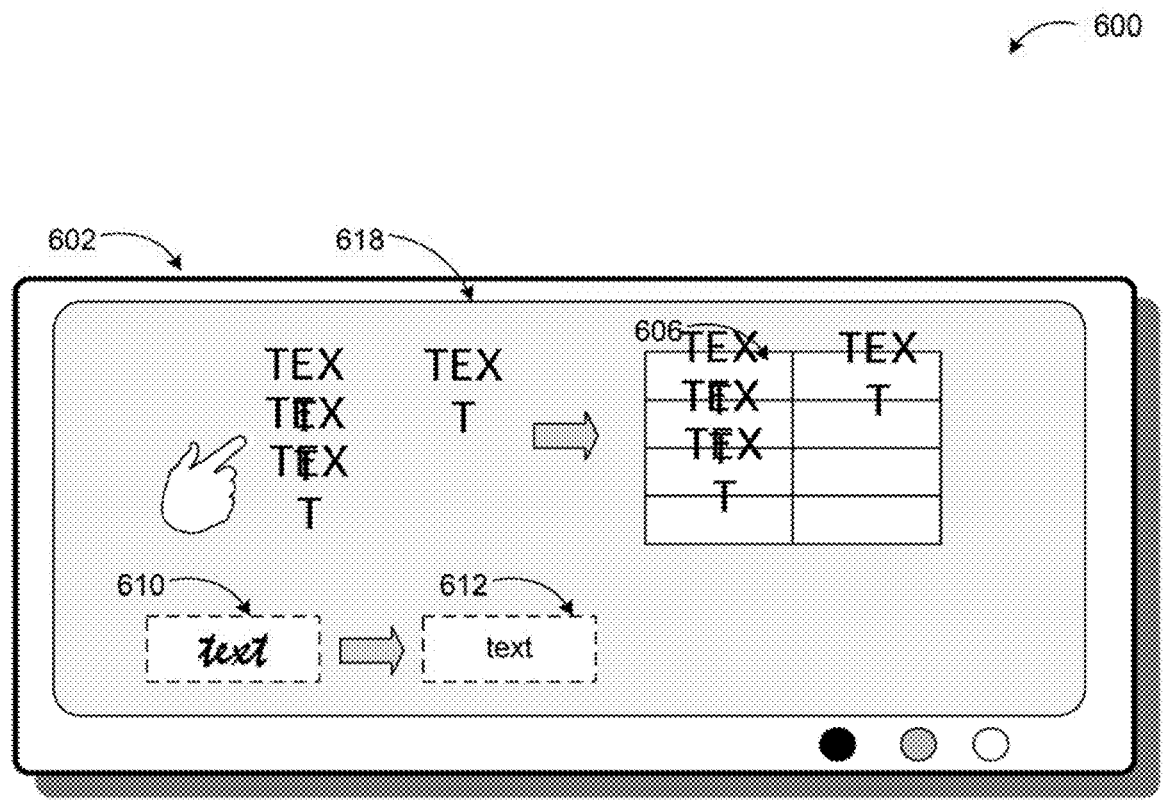
Figure 6:
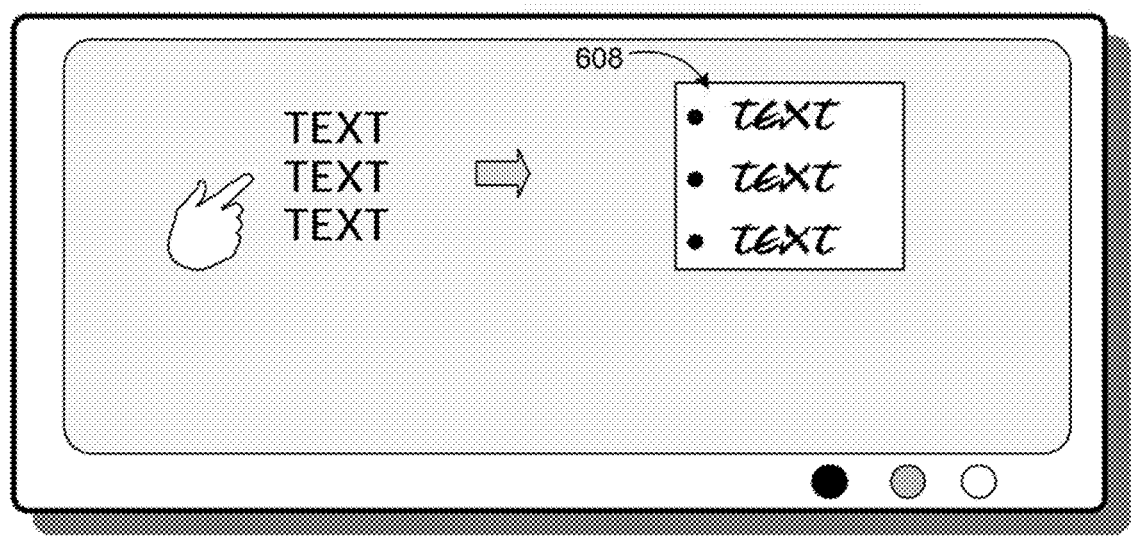

FIG. 6 illustrates automatic transformation of content based on predicted input, according to some embodiments. As demonstrated in diagram 600, a whiteboard 602 may automatically transform and format tent input on a canvas 618. For example, when a user adds graphics or handwriting input 610 to the whiteboard canvas employing an electronic pen or stylus, the whiteboard canvas may recognize the handwriting input 610, and the inserted handwriting may be recognized and stored in the background for enabling processing such as searches, automatic object and container creation, and record creation as some examples. The inserted handwriting input 610 may also be replaced on the canvas with regular text 612 for enhancing legibility on the canvas 618 based on user preferences.

In another example embodiment, when a user adds graphics or text input to the canvas, the whiteboard 602 may recognize the input, and the whiteboard may present a suggested object, interface, and/or container for the input based. For example, if the whiteboard recognizes that the user is creating a list, the whiteboard may automatically format the input as a list 608 and provide user interface elements associated with the list 608, such as bullets or numbers. In another example, if the whiteboard 602 determines that the user is creating a table, the whiteboard may automatically format the input into a table 606 rig user interface elements associated with the table 606 such as cell boundaries. The whiteboard 602 may also provide automatic functions associated with the table, such as automatic calculations and formulas, as some examples. Further, created content on the whiteboard 602 may also be integrated with other applications such as word processing, spreadsheet, and presentation applications for providing automatic formatting suggestions.

Figure 7:
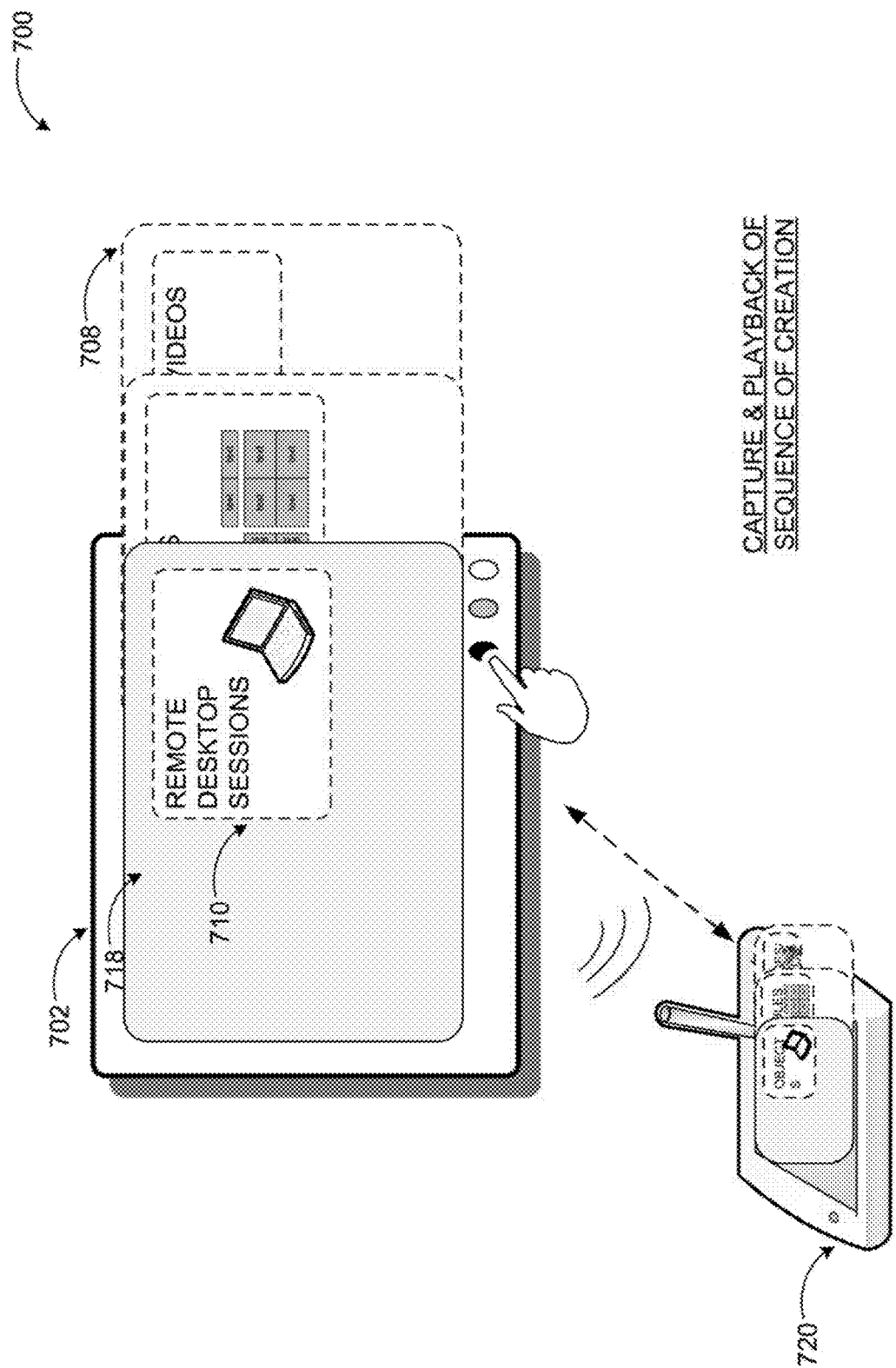
FIG. 7 illustrates example capture and playback of content creation on a whiteboard canvas.

FIG. 7 illustrates example capture and playback of content creation on a whiteboard canvas, according to some embodiments. As illustrated in diagram 700, a whiteboard may enable capture and playback of content creation on the whiteboard canvas 718 The playback may be viewed on the whiteboard 702, and also on a client device 720 associated with the whiteboard 702. For example, a user may move or close a current canvas 708 to open a new canvas 710, and the current canvas 708 may become hidden while the new canvas 710 may be displayed on the whiteboard 702. The current canvas 708 and content eluded on the current canvas may be saved such that it may be available for future use. The current canvas may be saved in a local memory or in a permanent storage, where it may be accessible for reopening on the whiteboard 702 and also on the client device 720 associated with the whiteboard 70.

Similarly, the creation, deletion, modification, and other manipulation actions of objects on the whiteboard canvas 718 may be preserved. The actions may be saved as a sequence such that a user's entire interaction or portions thereof with the whiteboard over a period of time may be played back on the whiteboard, and also on the associated client device 720. In some it embodiments, permission level settings for each user interacting with the whiteboard may be detected and whiteboard records provided to the two or more users concurrently based on a most restrictive detected permission level setting.

Figure 8:
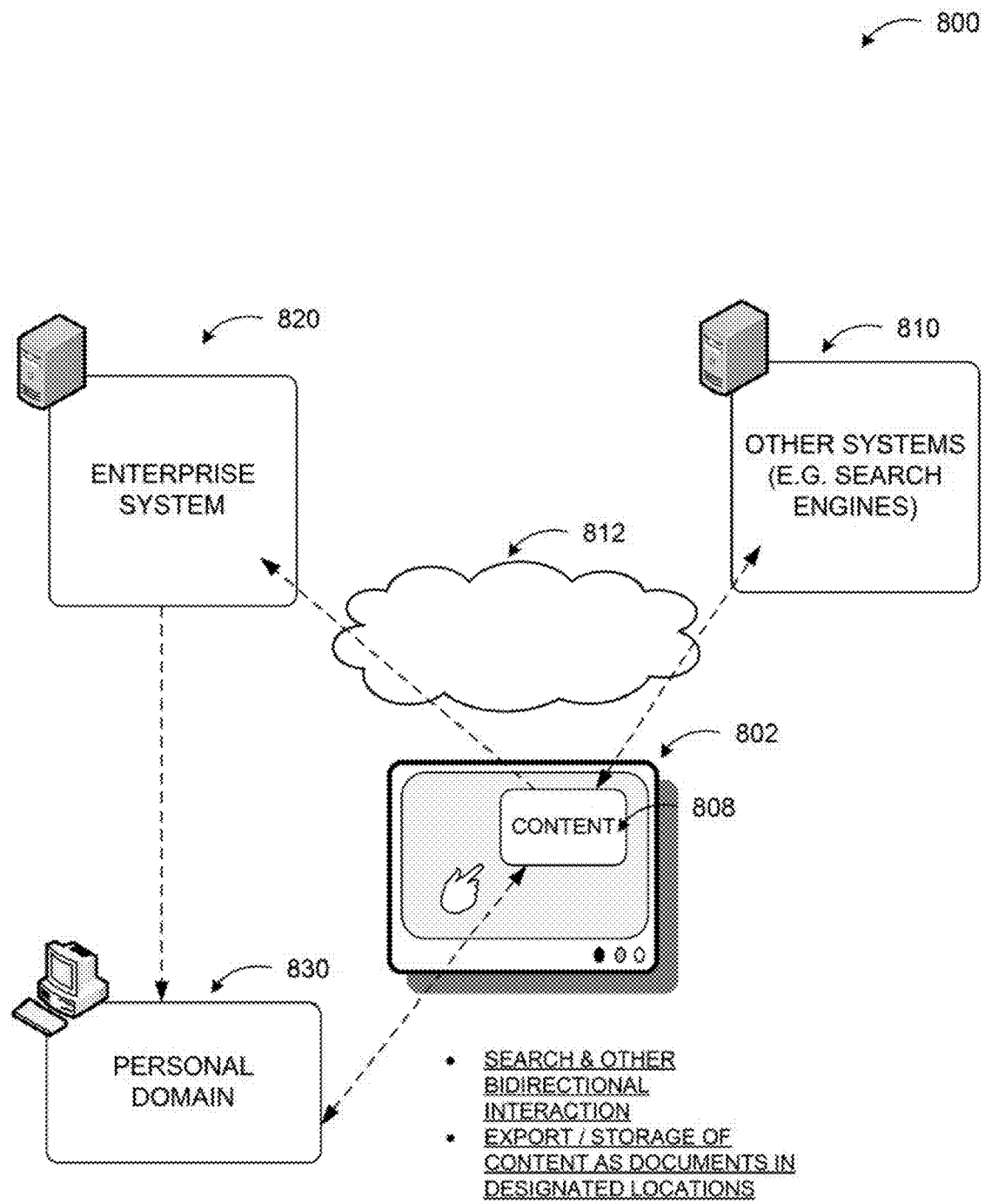
FIG. 8 illustrates example actions associated with objects an a whiteboard canvas, according to embodiments.

FIG. 8 illustrates example actions associated with objects on a whiteboard canvas, according to some embodiments. As illustrated in diagram 800, content on a whiteboard canvas may be actionable, such that a selection of an object 808 on the whiteboard may enable further actions to be performed. For example, an object 808 may be linked to a search engine 810 and a web browser over a network 812 for enabling search actions to be performed associated with a selected object. Additionally, content from the whiteboard may be exported and stored as an independent document on an external system such as an enterprise management system 820 and/or a personal domain 830 (local or networked data storage associated with a user).

Users may be able to access the content documents via the enterprise management system 820, and also on the personal domain 830 associated with the user, either directly from the whiteboard 802 or through the enterprise management system 820. The user may provide additional content to a document for later use on the whiteboard, and the document may subsequently be accessed for viewing on the whiteboard 802 from where it is stored at the enterprise management system 820 or on a personal domain 830.

Figure 9:
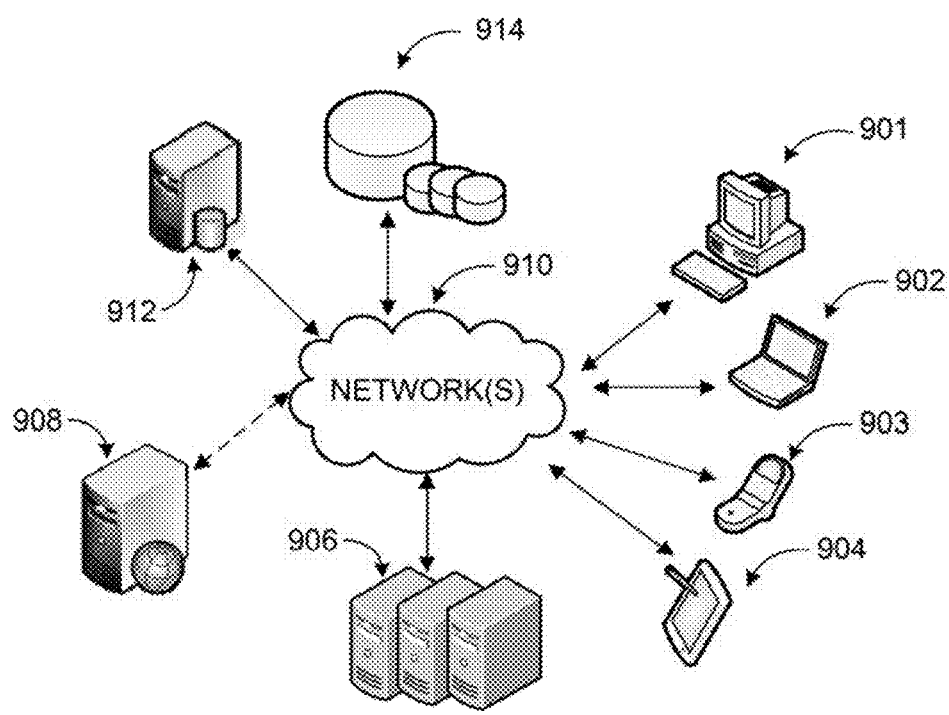
FIG. 9 is a networked environment, where a system according to embodiments may be implemented.

FIG. 9 is an example networked environment, where embodiments may be implemented. In addition to locally installed applications, such as whiteboard management application 622 discussed below, may also be employed in conjunction with hosted applications and services that may be implemented via software executed over one or more servers 906 or individual server 908. A hosted whiteboard service or application may be a web-based service or application, a cloud based service or application, and similar ones, and communicate with client applications on individual computing devices such as a desktop computer 901, a laptop computer 902, a smart phone 903, or a tablet computer 904 ('client devices') through network(s) 910 and control a user interface presented to users. One example of a web-based service may be a productivity suite that provides word processing, spreadsheet, communication, scheduling, presentation, and similar applications to clients through a browser interface on client devices. Such a service may enable users to interact with a whiteboard, and may enable the whiteboard to operate in private and public modes, providing access to appropriate whiteboard record by users as discussed herein.

Client devices 901-904 are used to access the functionality provided by the hosted service or application. One or more of the servers 906 or server 908 may be used to provide a variety of services as discussed above. Relevant data may be stored in one or more data stores (e.g. data store 914), which may be managed by any one of the servers 906 or by database server 912.

Network(s) 910 may comprise any topology of servers, clients, Internet service providers, and communication media. A system according to embodiments may have a static or dynamic topology. Network(s) 910 may include a secure network such as an enterprise network, an unsecure network such as a wireless open network, or the Internet. Network(s) 910 may also coordinate communication over other networks such as PSTN or cellular networks. Network(s) 910 provides communication between the nodes described herein. By way of example, and not limitation, network(s) 910 may include wireless media such as acoustic, RF, infrared and other wireless media.

Many other configurations of computing devices, applications, data sources, and data distribution systems may be employed to provide smart interaction with a whiteboard. Furthermore, the networked environments discussed in FIG. 9 are for illustration purposes only. Embodiments are not limited to the example applications, modules, or processes.

Figure 10:
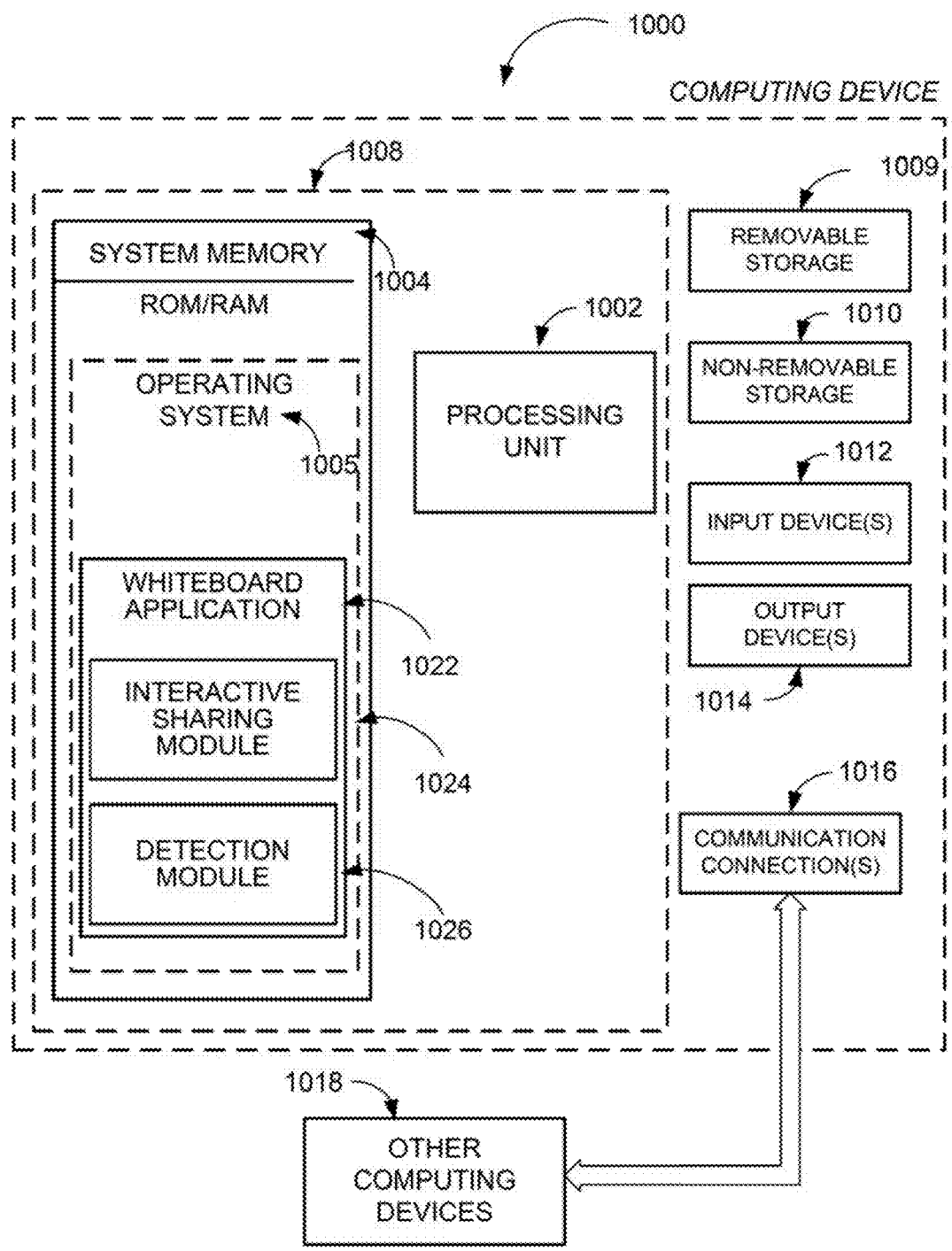
FIG. 10 is a block diagram of an example computing operating environment, where embodiments may be implemented.

FIG. 10 and the associated discussion are intended to provide a brief, general description of a suitable computing environment in which embodiments may be implemented. With reference to FIG. 10, a block diagram of an example computing operating environment for an application according to embodiments is illustrated, such as computing device 1000. In a basic configuration, computing device 1000 may be any touch and/or gesture enabled device in stationary, mobile, or other form such as the example devices discussed in conjunction with FIG. 1-4, and include at least one processing unit 1002 and system memory 1004. Computing device 1000 may also include a plurality of processing units that cooperate in executing programs. Depending on the exact configuration and type of computing device, the system memory 1004 may be volatile (such as RAM), non-volatile (such as ROM, flash memory, etc.) or some combination of the two. System memory 1004 typically includes an operating system 1005 suitable for controlling the operation of the platform, such as the WINDOWS®, WINDOWS MOBILE®, or WINDOWS PHONE® operating systems from MICROSOFT CORPORATION of Redmond, Wash. The system memory 1004 may also include one or more software applications such as program modules 1006, whiteboard management application 1022, and interactive sharing module 1024 and detection module 1026.

Interactive sharing module 1024 may operate in conjunction with the operating system 1005 or whiteboard management application 1022 to enable smart interactions with a whiteboard as discussed previously. Detection module 1026 may enable detection of user interactions with the whiteboard through various input mechanisms, remote device input, etc. for content creation, content editing, user identification, and comparable actions. This basic configuration is illustrated in FIG. 10 by those components within dashed line 1008.

Computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by removable storage 1009 and non-removable storage 1010. Computer readable storage media may include volatile and nonvolatile, removable and non-removable media implemented in any method or technology for storage of information, such as computer readable instructions, data structures, program modules, or other data. System memory 1004, removable storage 1009 and non-removable storage 1010 are all examples of computer readable storage media. Computer readable storage media includes, hut is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer readable storage media may be part of computing device 1000. Computing device 1000 may also have input device(s) 1012 such as keyboard, mouse, pen, voice input device, touch input device, an optical capture device for detecting gestures, and comparable input devices. Output device(s) 1014 such as a display, speakers, printer, and other types of output devices may also be included. These devices are well known in the art and need not be discussed at length here.

Computing device 1000 may also contain communication connections 1016 that allow the device to communicate with other devices 1018, such as over a wireless network in a distributed computing environment, a satellite link, a cellular link, and comparable mechanisms. Other devices 1018 may include computer device(s) that execute communication applications, other directory or policy servers, and comparable devices. Communication connection(s) 1016 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 11:
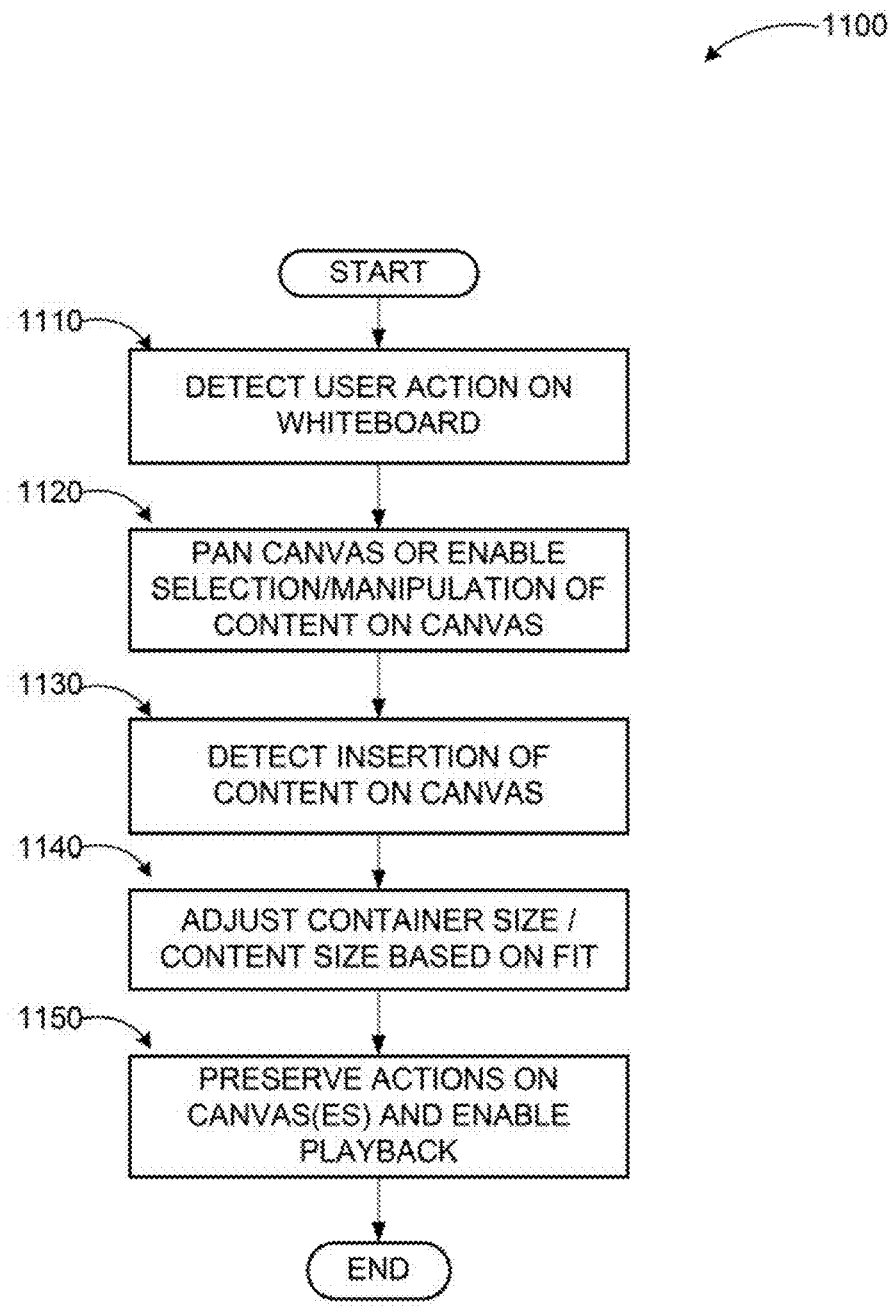
FIG. 11 illustrates a logic flow diagram for a process of enabling interactive whiteboard content management, according to embodiments.

FIG. 11 illustrates a logic flow diagram for a process of enabling smart interactions with a whiteboard, according to some example embodiments. Process 1100 may be implemented as part of an application or an operating system.

Process 1100 begins with operation 1110, where a user action through a touch, a gesture, a pen, a keyboard, a mouse, an eye-tracking input, a gyroscopic input, etc. may be detected on a whiteboard. At operation 1120, the canvas may be panned bringing into new a blank canvas or a selection/manipulation of one or more objects on the canvas enabled depending on the type or style of input. For example, a particular tough or gesture action may result in one action, while another may result in the other action. Similarly, the input mechanism may be associated with the different types of actions.

At operation 1130, an insertion of new content may be detected on the canvas. At following, operation 1140, a size of an existing or newly created (e.g., by inference of user intent) container for the inserted content may be adjusted either to remove unused space around the content or fit content that exceeds boundaries of the container. Similarly, a size of the inserted content may also be adjusted.

At operation 1150, a sequence of content creation, manipulation, and/or deletion may be captured and preserved such that the sequence may be played back on-demand through the whiteboard or through a computing device (e.g., a tablet) that is either directly (wired or wirelessly) or indirectly (e.g., through a network) connected to the whiteboard or a data store where the sequence is stored.

The operations included in process 1100 are for illustration purposes. Enabling smart interactions with a whiteboard according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device to provide smart whiteboard interactions, the method comprising:
   assigning a type of input action to a type of input method;
   detecting a selection of a region on a canvas displayed through a whiteboard via the type of input method;
   recognizing the type of input action based on the type of input method as one or more of a creation of new content, a modification of existing content, and a deletion of the existing content associated with the selected region;
   adjusting a size of a container for the selected region to accommodate the one or more of the creation, the modification, and the deletion;
   adjusting a size of the canvas to accommodate the one or more of the creation, the modification, and the deletion; and
   capturing and preserving a sequence of the one or more of the creation, the modification, and the deletion to be played back through the whiteboard.

2. The method of claim 1, wherein detecting the selection of the region comprises:
   detecting a selection of an object within the region.

3. The method of claim 1, wherein the type of input method is a pen input or touch input.

4. The method of claim 1, further comprising:
   in response to detecting an action on the canvas via another type of input method, recognizing another type of input action based on the other type of input method as one or more of a panning of the canvas, a move of an object, a zoom action on the object, and a connection of two or more objects.

5. The method of claim 4, further comprising:
   if the recognized type of input action is the panning of the canvas and the canvas is panned in a direction that results in display of a new blank canvas on the whiteboard, preserving content displayed on the canvas by storing the content in one of a local data store and a networked data store.

6. The method of claim 1, wherein adjusting the size of the container for the selected region to accommodate the one or more of the creation, the modification, and the deletion comprises:

reducing the size of the container to remove unused space within the container.

7. The method of claim 1, wherein adjusting the size of the container for the selected region to accommodate the one or more of the creation, the modification, and the deletion comprises:
expanding the size of the container if boundaries of the container are exceeded.

8. The method of claim 1, further comprising:
creating a new container for the selected region to accommodate the one or more of the creation, the modification, and the deletion.

9. The method of claim 1, further comprising:
if the type of input action includes the creation of new content and the new content is ink:
recognizing the ink, wherein the ink is one of text and graphics; and
one of preserving the ink on the canvas and replacing the ink with standardized content based on the recognition depending on a whiteboard default parameter or a user preference.

10. The method of claim 9, further comprising:
rendering the ink usable for one or more of a search, an automatic container creation, and a record creation.

11. The method of claim 1, wherein preserving the sequence of the creation, the modification, or the deletion comprises:
storing the sequence in one of a local data store and a networked data store.

12. A computing device to provide smart whiteboard interactions, the computing device comprising:
a user interface on a surface of the computing device;
a memory storing instructions; and
a processor coupled to the user interface and the memory, wherein the processor is configured to:
assign a type of input action to a type of input method;
detect a selection of a region on a canvas displayed through the user interface via the type of input method;
recognize the type of input action based on the type of input method as one or more of a creation of new content, a modification of existing content, and a deletion of the existing content associated with the selected region;
adjust a size of a container for the selected region to accommodate the one or more of the creation the modification, and the deletion;
adjust a size of the canvas to accommodate the one or more of the creation, the modification, and the deletion; and
capture and preserve a sequence of the one or more of the creation, the modification, or the deletion to be played back through the user interface.

13. The computing device of claim 12, wherein the processor is further configured to detect a selection of an object with the selected region of the canvas.

14. The computing device of claim 13, wherein the processor is further configured to group the new content and/or the existing content based on a type of the object.

15. The computing device of claim 13, wherein the object is one of a table, a list, and a graphical object.

16. The computing device of claim 13, wherein the object is one of explicitly created by a user and automatically generated through inference of user intent.

17. A system to provide smart whiteboard interactions, the system comprising:
one or more computing devices; and
an interactive whiteboard communicatively coupled to the one or more computing devices over a network, the interactive whiteboard comprising:
a user interface on a surface of the interactive whiteboard;
a memory storing instructions; and
a processor coupled to the user interface and the memory, wherein the processor is configured to:
assign a type of input action to a type of input method;
detect a selection of a region on a canvas displayed through the user interface via the type of input method;
recognize the type of input action based on the type of input method as one or more of a creation of new content, a modification of existing content, or a deletion of the existing content associated with the selected region;
adjust a size of a container for the selected region to accommodate the one or more of the creation, the modification, or the deletion;
adjust a size of the canvas to accommodate the one or more of the creation, the modification, and the deletion; and
capture and preserve a sequence of the one or more of the creation, the modification, or the deletion to be played back through the user interface and provided to the one or more computing devices.

18. The system of claim 17, further comprising:
a projector configured to display a desktop of the one or more computing devices on the user interface of the interactive whiteboard.

19. The system of claim 17, wherein the processor of the interactive whiteboard is further configured to receive computing device input from the one or more computing devices as another type of input method.

20. The system of claim 17, wherein the processor of the interactive whiteboard is further configured to share the user interface of the interactive whiteboard with the one or more computing devices such that each of the one or more computing devices displays the canvas.

21. The system of claim 17, wherein the processor of the interactive whiteboard is further configured to:
determine permission level settings for each user associated with the one or more computing devices communicatively coupled to the whiteboard; and
provide whiteboard records comprising the sequence to the one or more computing devices based on a most restrictive detected permission level setting.

* * * * *